US012485521B2

(12) United States Patent
Pu

(10) Patent No.: US 12,485,521 B2
(45) Date of Patent: Dec. 2, 2025

(54) ELECTRIC TOOL

(71) Applicant: JIANGSU DONGCHENG TOOLS TECHNOLOGY CO., LTD, Jiangsu (CN)

(72) Inventor: Yuanwei Pu, Jiangsu (CN)

(73) Assignee: JIANGSU DONGCHENG TOOLS TECHNOLOGY CO., LTD, Jiangsu (CN)

( * ) Notice: Subject to any disclaimer, the term of this patent is extended or adjusted under 35 U.S.C. 154(b) by 0 days.

(21) Appl. No.: 18/700,323

(22) PCT Filed: May 9, 2023

(86) PCT No.: PCT/CN2023/092928
§ 371 (c)(1),
(2) Date: Apr. 11, 2024

(87) PCT Pub. No.: WO2024/187569
PCT Pub. Date: Sep. 19, 2024

(65) Prior Publication Data

US 2025/0222580 A1 Jul. 10, 2025

(30) Foreign Application Priority Data

Mar. 15, 2023 (CN) ......................... 202310250569.2

(51) Int. Cl.
*B25D 11/06* (2006.01)
*B25D 17/06* (2006.01)
*B25D 17/24* (2006.01)

(52) U.S. Cl.
CPC .............. *B25D 11/06* (2013.01); *B25D 17/06* (2013.01); *B25D 17/24* (2013.01); *B25D 2211/003* (2013.01); *B25D 2222/72* (2013.01); *B25D 2250/231* (2013.01); *B25D 2250/345* (2013.01)

(58) Field of Classification Search
CPC ........ B25D 11/06; B25D 17/06; B25D 17/24; B25D 2211/003; B25D 2250/231; B25D 2250/345
See application file for complete search history.

(56) References Cited

U.S. PATENT DOCUMENTS

| | | | | |
|---|---|---|---|---|
| 5,871,059 | A | 2/1999 | Shibata et al. | |
| 9,969,073 | B2 * | 5/2018 | Ontl | B25D 11/005 |
| 10,058,987 | B2 * | 8/2018 | Wiedner | B25D 11/06 |
| 10,190,604 | B2 * | 1/2019 | Dostinov | F15B 11/08 |
| 10,391,621 | B2 * | 8/2019 | Wiedner | B25D 16/00 |

(Continued)

FOREIGN PATENT DOCUMENTS

| | | | | |
|---|---|---|---|---|
| CN | 103538032 B | 11/2017 | | |
| DE | 102008061173 A1 * | 6/2010 | | B25D 11/125 |

*Primary Examiner* — Thanh K Truong
*Assistant Examiner* — David G Shutty
(74) *Attorney, Agent, or Firm* — Che-Yang Chen

(57) ABSTRACT

The present disclosure relates to an electric tool, including a housing, a motor accommodated in the housing, a transmission mechanism, and an impact mechanism, where the impact mechanism includes an air cylinder, and an impact rod, a guide device, an impact hammer, and a piston arranged in the air cylinder; and when the impact rod moves along a direction opposite to an output direction, a second guide part sequentially supports a third section and a second section greater than the third section in diameter.

10 Claims, 5 Drawing Sheets

(56) References Cited

U.S. PATENT DOCUMENTS

| | | | | |
|---|---|---|---|---|
| 10,414,035 | B2 * | 9/2019 | Ohlendorf .............. | B25D 16/00 |
| 2011/0303429 | A1 * | 12/2011 | Kohlschmied ....... | B25D 11/005 173/112 |

* cited by examiner

ELECTRIC TOOL

CROSS REFERENCE OF RELATED APPLICATION

This application is a U.S. National Stage under 35 U.S.C. 371 of the International Application PCT/CN2023/092928, filed on May 9, 2023, which claims to Chinese Patent Application No. CN202310250569.2, filed on Mar. 15, 2022, the contents of which are incorporated herein by reference in their entirety.

TECHNICAL FIELD

The present disclosure relates to the field of electric tools, in particular to an electric tool for performing impact or rotary impact operation on structures such as concrete and bricks.

BACKGROUND

An electric tool, such as an electric hammer, typically includes an impact hammer located in an air cylinder, an impact rod, and a locking part for locking the impact hammer when the electric hammer is unloaded. When the electric hammer is unloaded, the impact hammer needs to be locked in a short time, to prevent the impact hammer from impacting parts inside the air cylinder with maximum energy.

For example, an electric hammer includes a guide mechanism for guiding the impact rod. When the impact rod impacts forward, the guide length is shortened, which can cause the impact rod to incline relative to an operating axis. This slight inclination leads to energy consumption, thereby preventing the impact rod from rapidly impacting the impact hammer backwards and taking the impact hammer out of the locking part when unloaded, avoiding repeated impacting (ineffective hammering) on the impact hammer when the electric hammer is unloaded, and prolonging the service life of the electric hammer. However, in this solution, in order to incline the impact rod, a sufficient gap needs to be provided between the impact rod and a support part for supporting the impact rod, and the gap causes the impact rod to incline slightly during forward impact output, resulting in low energy transfer efficiency when the impact hammer impacts the inclined impact rod.

In view of this, it is indeed necessary to provide an improved electric tool, to overcome the defects existing in the prior art.

SUMMARY

In view of the deficiencies in the prior art, an objective of the present disclosure is to provide an electric tool which has a good effect of preventing ineffective hammering and can avoid energy loss during impact output.

To solve the existing technical problems, the present invention adopts the following technical solution: an electric tool is provided, including a housing, a motor accommodated in the housing, a transmission mechanism, and an impact mechanism, where the impact mechanism includes an air cylinder, and an impact rod, a guide device, an impact hammer, and a piston arranged in the air cylinder, the piston compresses air and drives the impact hammer to impact the impact rod, the guide device includes a first guide part and a second guide part located behind the first guide part, the impact rod has a first section sliding along the first guide part, and a second section and a third section which slide along the second guide part, and a radial size of the third section is smaller than a radial size of the second section;

when the impact rod moves along an output direction, the second guide part sequentially supports the second section and the third section; and when the impact rod moves along a direction opposite to the output direction, the second guide part sequentially supports the third section and the second section, such that the impact rod is inclined relative to an axis of the air cylinder before moving.

Further, an angle of inclination of the impact rod relative to the axis of the air cylinder is 0.2°-0.5°.

Further, a radial size of the first section is equal to the radial size of the second section.

Further, the impact rod further includes a connecting section for connecting the first section to the second section, a radial size of the connecting section is greater than the radial size of the first section and the radial size of the second section, and the connecting section limits the impact rod between the first guide part and the second guide part.

Further, the first guide part is a first step part protruding inwards along a radial direction of the air cylinder and integrally formed with the air cylinder; and the first section penetrates through the first step part and extends forward.

Further, the impact mechanism further includes a sleeve axially limited in the air cylinder and located behind the first step part, and the second guide part is a second step part protruding inwards along a radial direction of the sleeve.

Further, the impact mechanism further includes a stop ring arranged between the first guide part and the connecting section; when the impact rod moves forward, the first section penetrates through the stop ring and the connecting section abuts against the stop ring; and when the impact rod moves backward, the connecting section abuts against the sleeve.

Further, the impact mechanism further includes a slip ring located between the stop ring and the sleeve, and the stop ring and the slip ring are limited between the first guide part and the second guide part in a relative sliding manner.

Further, a flange part protrudes outward along a radial direction of an end part of the impact hammer that faces the impact rod, the impact mechanism further includes a locking part limited in the air cylinder and clamped with the flange part, and when the electric tool is in an unloaded state, the flange part is clamped in the locking part.

Further, a third step surface protrudes inward along a radial direction of an inner wall of the air cylinder, and the sleeve has a front side abutting against the third step surface and a rear side abutting against the locking part.

Compared with the prior art, the present disclosure has the following beneficial effects:

When the impact rod moves along the direction opposite to the output direction, the second guide part sequentially supports the third section and the second section greater than the third section in diameter; a gap between the second guide part and the third section is added, such that the impact rod is inclined relative to the axis of the air cylinder before moving; when the electric tool is unloaded, the inclination consumes energy of the impact rod moving in the opposite direction to prevent the impact rod from taking the impact hammer away from the locking part, thereby preventing impact when the impact hammer is unloaded from affecting the service life of the electric tool; when the electric tool is loaded, the inclination also consumes the energy of the impact rod to reduce a recoil force of the impact rod on the electric tool; before the impact rod is impacted, the second guide part supports the second section; and in this case, an axis of the impact rod coincides with the axis of the air cylinder, the impact hammer impacts the impact rod along a linear direction, and the impact rod outputs impact along the linear direction to improve the energy transfer efficiency.

BRIEF DESCRIPTION OF THE DRAWINGS

The specific embodiments of the present disclosure are further described in detail below with reference to the accompanying drawings.

DESCRIPTION OF THE EMBODIMENTS

Figure 1:
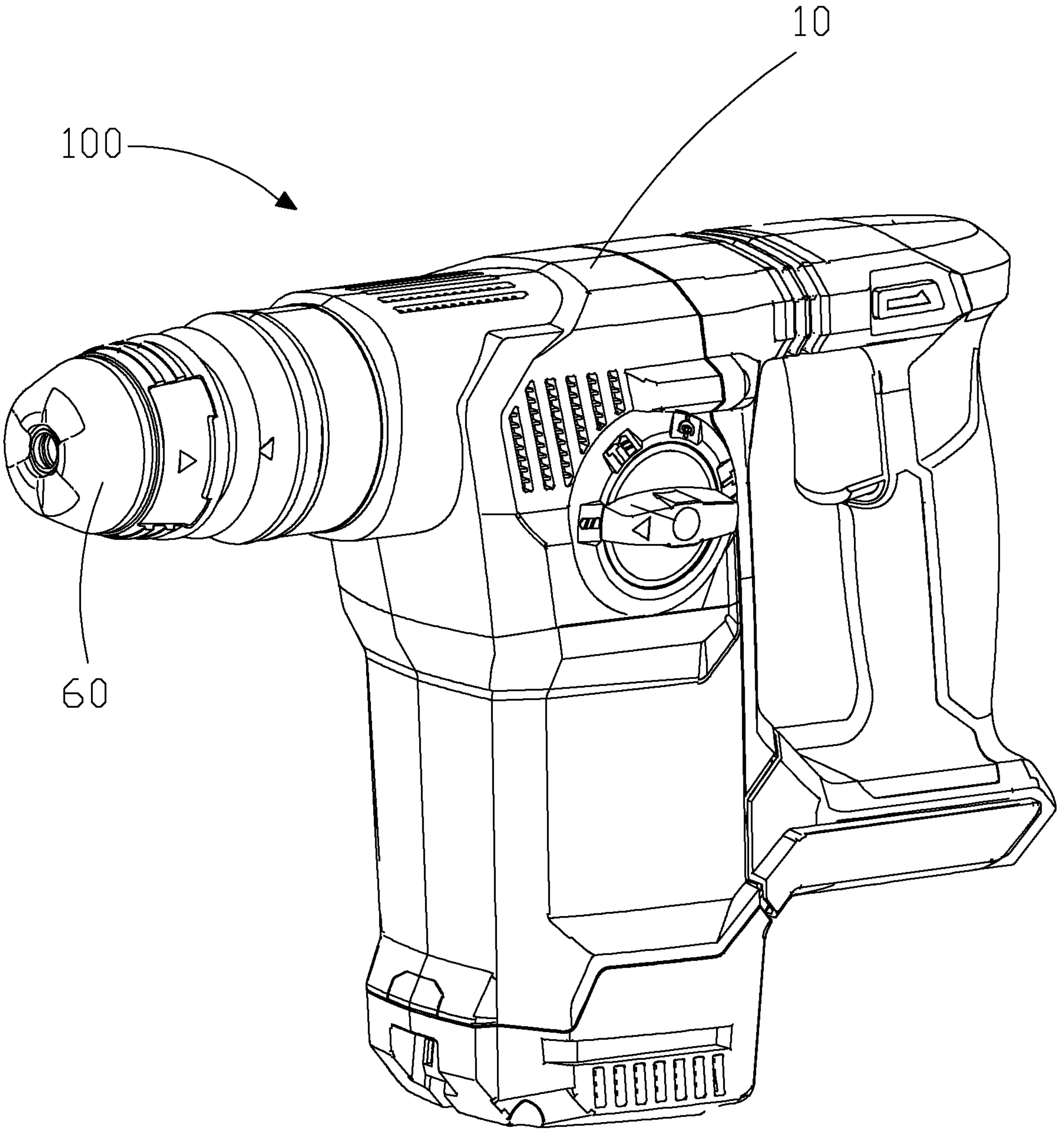
FIG. 1 is a schematic three-dimensional view of an electric tool according to a preferred embodiment of the present disclosure.

The terms used in the present disclosure are only for the purpose of describing the specific embodiments and are not intended to limit the present disclosure. The orientations or positional relationships indicated by the terms "upper", "lower", "front", "rear", etc. below are based on the orientations or positional relationships shown in the accompanying drawings, merely for the convenience of describing the present disclosure and simplifying the description, rather than indicating or implying that the referred device or element must have a particular orientation or be constructed and operated in a particular orientation, and therefore cannot be understood as limiting the present disclosure.

Reference is made to FIG. 1 to FIG. 5, which show an electric tool 100 according to a preferred embodiment of the present disclosure. In this embodiment, the electric tool 100 is an electric hammer for drilling or chiseling on walls, cement floors, and other occasions. An output direction of the electric tool 100 is defined as a front direction. The electric tool 100 includes a housing 10, a motor 20 arranged in the housing 10, a transmission mechanism 30, an impact mechanism 40, a chuck 60 extending outwards along a front end of the housing 10, and a working head (not shown in figures) fixed in the chuck 60. After the electric tool 100 is started, the motor 20 drives the impact mechanism 40 by the transmission mechanism 30 to input impact, and the impact mechanism 40 drives the working head in the chuck 60 to output the impact.

Figure 2:
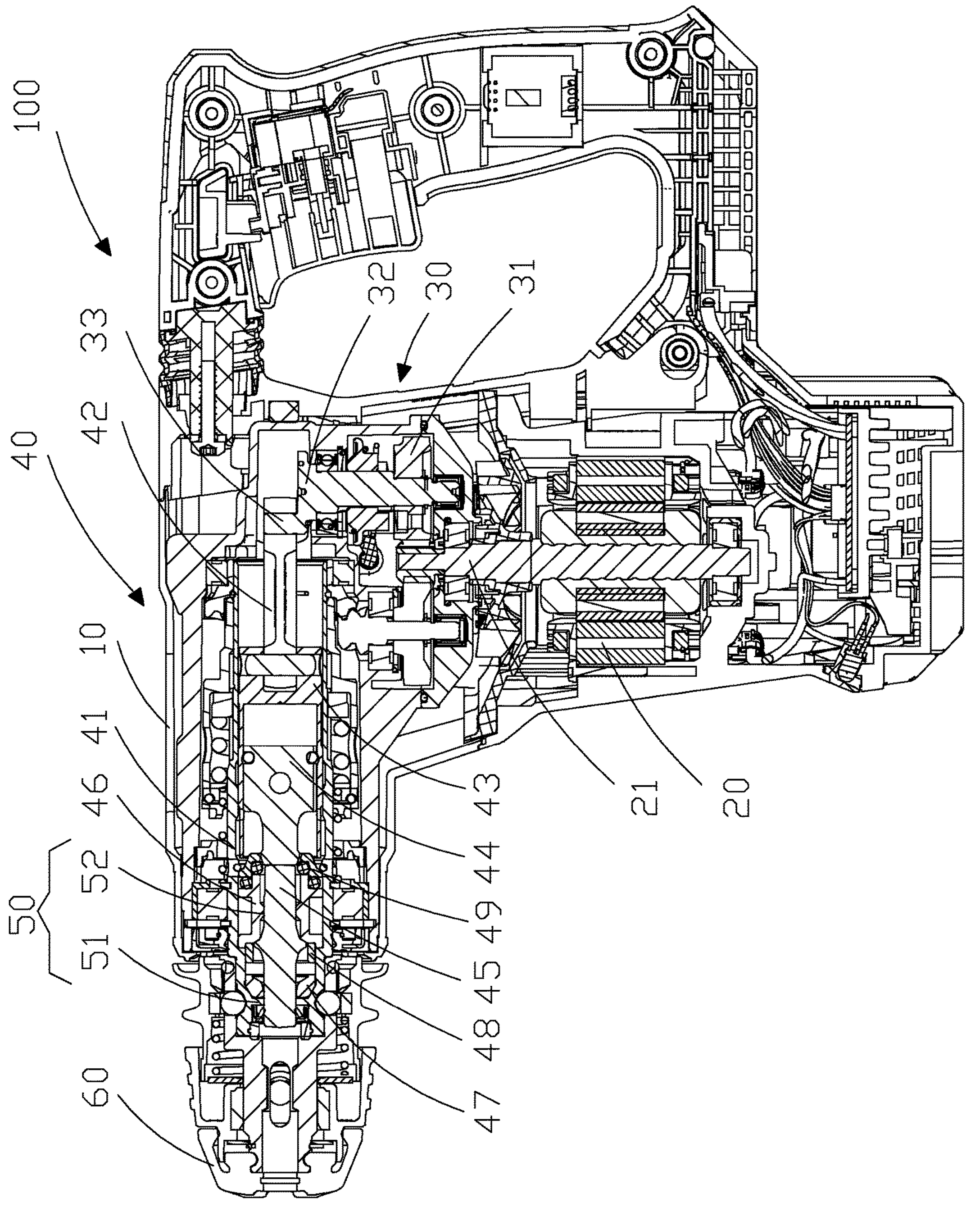
FIG. 2 is a sectional view of the electronic tool shown in FIG. 1.
Figure 3:
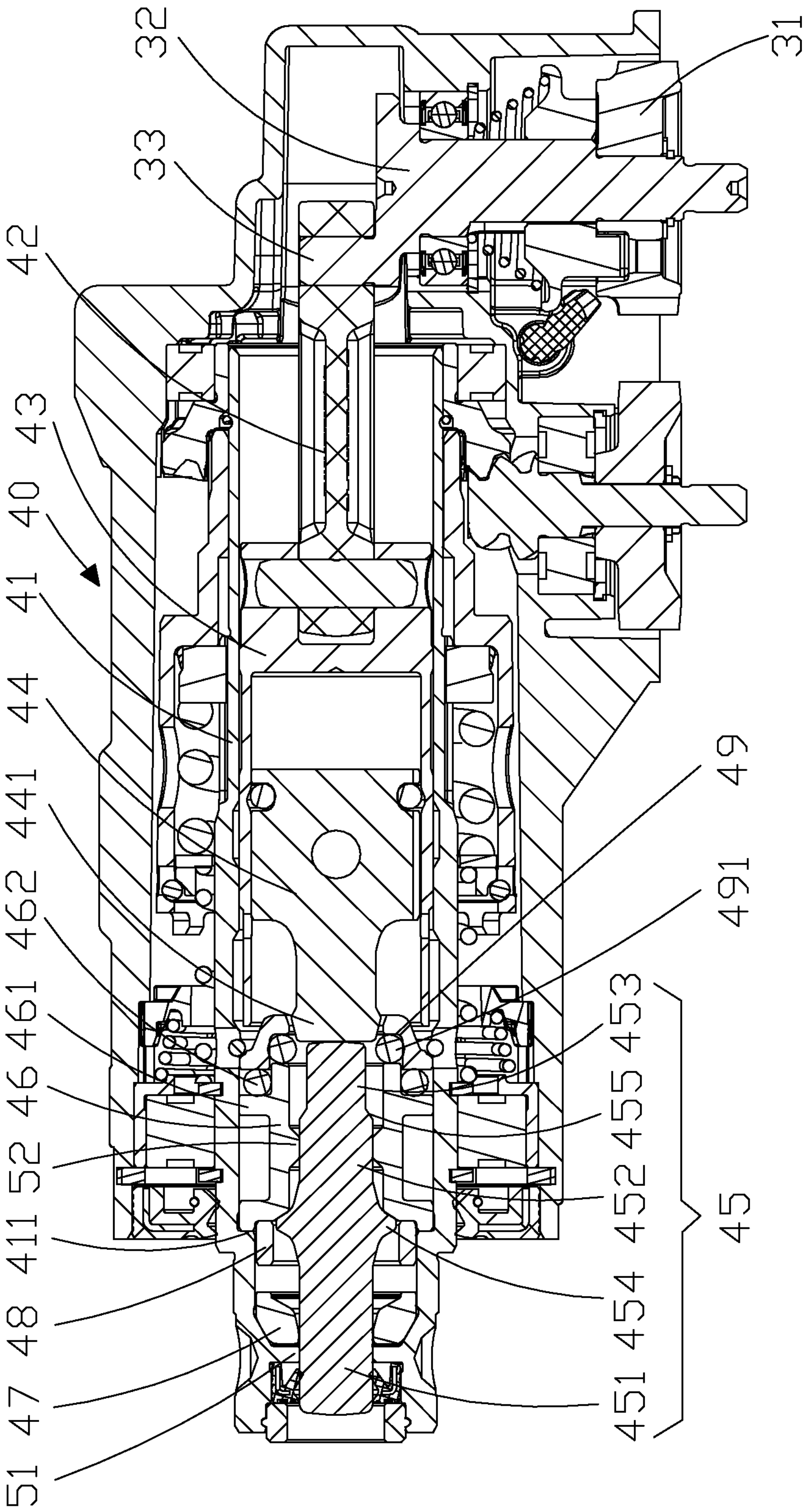
FIG. 3 is a schematic partial enlarged view of the electronic tool shown in FIG. 1 in an operating state.
Figure 4:
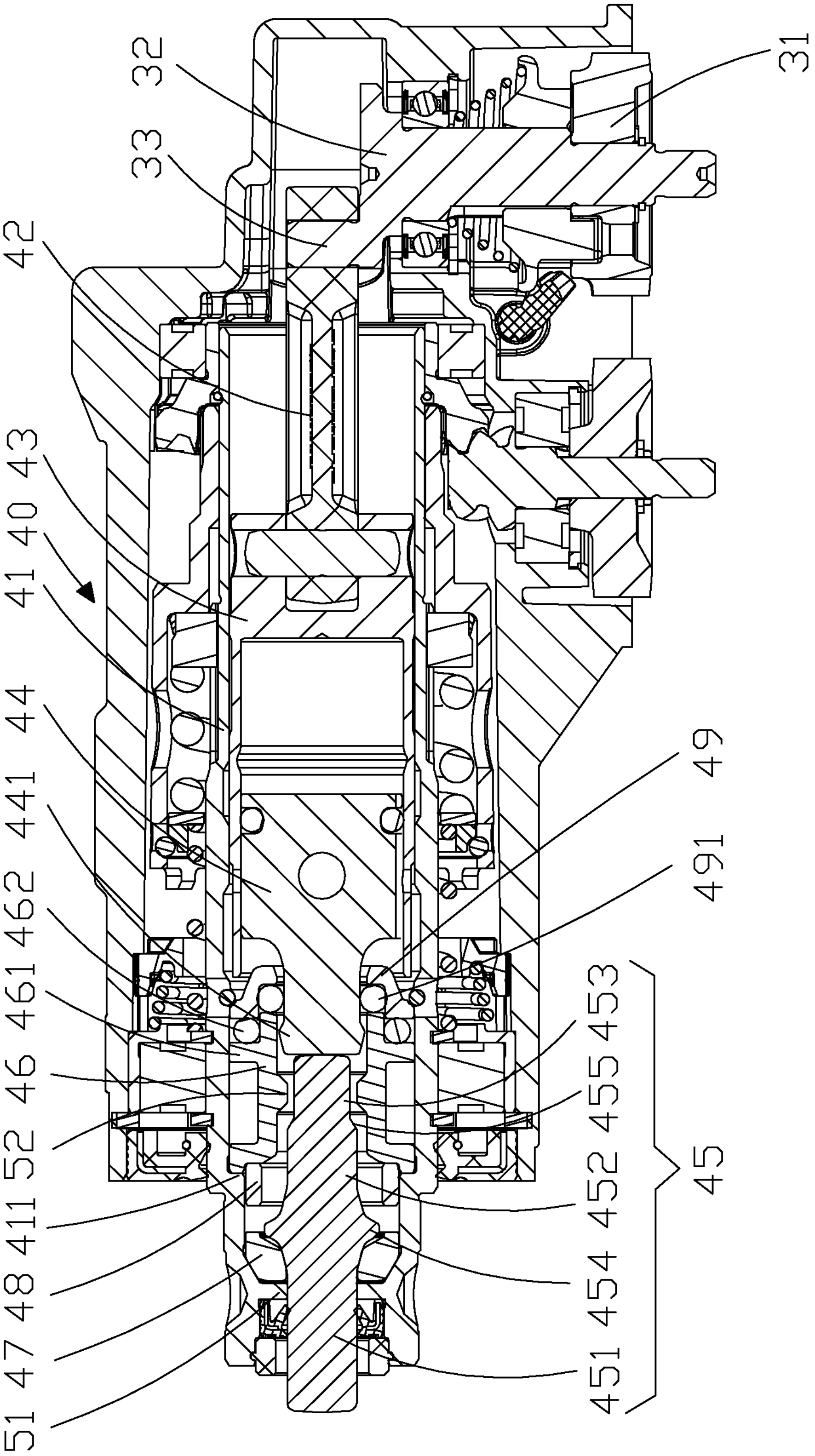
FIG. 4 is a schematic partial enlarged view of the electronic tool shown in FIG. 1 in a hammer locking state.

Referring to FIG. 2 to FIG. 4, the motor 20 includes a motor shaft 21 extending along an axial direction perpendicular to the output direction, and the transmission mechanism 30 includes a gear 31 meshed with the motor shaft 21, an eccentric wheel 32 in transmission connection with the gear 31, and an eccentric pin 33 integrated with the eccentric wheel 32. The motor shaft 21 drives the eccentric wheel 32 by the gear 31 to rotate.

The impact mechanism 40 includes an air cylinder 41, and an impact rod 45, a guide device 50, a stop ring 47, a slip ring 48, a sleeve 46, a buffer ring 462, a locking part 49, an impact hammer 44, a piston 43, and a connecting rod 42 sequentially arranged in the air cylinder 41 from front to rear. The connecting rod 42 has a rear end sleeved on the eccentric pin 33 and a front end pivotally connected to the piston 43; and the eccentric wheel 32 drives the piston 43 by the connecting rod 42 to move back and forth, the piston 42 moving back and forth compresses air and drives the impact hammer 44 to impact the impact rod 45, and the impact rod 45 impacted impacts the working head along the output direction.

Referring to FIG. 3 and FIG. 4, a flange part 441 protrudes outward along a radial direction of an end part of the impact hammer 44 that faces the impact rod 45, the impact mechanism 40 further includes a locking part 49 limited in the air cylinder 41 and clamped with the flange part 441, and an O-shaped ring 491 for locking the hammer is provided in the locking part 49. When the electric tool 100 is in an unloaded state, the working head is not in contact with a machined part, the impact hammer 44 impacts the impact rod 45 along the output direction, and the impact rod 45 pushes the working head to a foremost end of the chuck 60. In this case, the flange part 441 of the impact hammer 44 penetrates through the O-shaped ring 491 and moves to the front of the O-shaped ring 491, and the flange part 441 is clamped in the O-shaped ring 491, thereby preventing the piston 43 from continuing driving the impact hammer 44 in the unloaded state.

When the electric tool 100 is unloaded and there is a large rebound force when the impact rod 45 impacts the stop ring 47, the impact rod 45 reversely impacts the impact hammer 44 clamped in the O-shaped ring 491. The impact hammer 44 is impacted repeatedly even if it is easily separated from the O-shaped ring 491, thereby affecting the service life of the electric tool 100.

Referring to FIG. 2 to FIG. 4, the guide device 50 includes a first guide part 51 and a second guide part 52 located behind the first guide part 51. The first guide part 51 is a first step part protruding inwards along a radial direction of the air cylinder 41 and integrally formed with the air cylinder 41. The second guide part 52 is a second step part protruding inwards along a radial direction of the sleeve 46. A front side of the sleeve 46 abuts against a third step surface 411 protruding inwards in the radial direction of the air cylinder 41, a periphery of the sleeve 46 that gets close to a rear end surface thereof is provided with a bulge 461 protruding outwards in the radial direction, and the bulge 461 abuts against the locking part 49 through the buffer ring 462.

Figure 5:
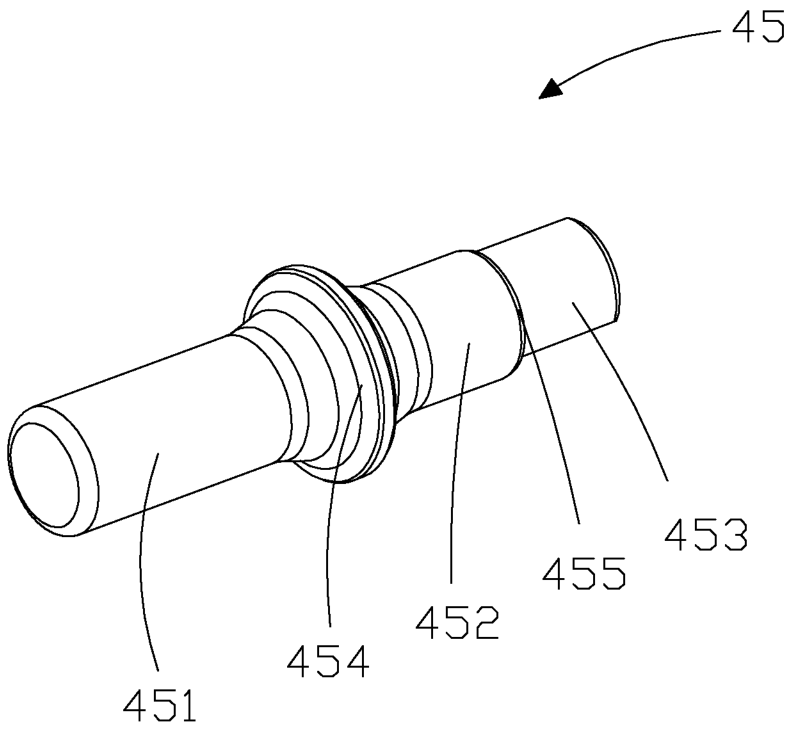
FIG. 5 is a schematic three-dimensional view of an impact rod of the electronic tool shown in FIG. 1.

Referring to FIG. 3 to FIG. 5, the impact rod 45 has a first section 451 sliding along the first guide part 51, and a second section 452 and a third section 453 which slide along the second guide part 52; the first section 451 penetrates through the first step part and extends forward; a radial size of the third section 453 is smaller than a radial size of the second section 452; and a radial size of the first section 451 is equal to that of the second section 452. When the impact rod 45 moves along the output direction, the second guide part 52 sequentially supports the second section 452 and the third section 453, that is, before the impact rod 45 is impacted, the second guide part 52 supports the second section 452. In this case, an axis of the impact rod 45 coincides with an axis of the air cylinder 41, the impact hammer 44 impacts the impact rod 45 along a linear direction, and the impact rod 45 outputs impact along the linear direction to improve the energy transfer efficiency. When the impact rod 45 moves along a direction opposite to the output direction, the second guide part 52 sequentially supports the third section 453 and the second section 452, such that the impact rod 45 is inclined relative to the axis of the air cylinder 41 before moving, where an angle of inclination of the impact rod 45 relative to the axis of the air cylinder 41 is 0.2-0.5°. When the electric tool 100 is unloaded, the inclination of the impact rod 45 consumes energy of the impact rod 45 moving in the opposite direction to prevent the impact rod 45 from taking the impact hammer 44 away from the O-shaped ring 491, thereby prolonging the service life of the electric tool 100; when the electric tool 100 is loaded, the inclination also consumes the energy of the impact rod 45 to reduce a recoil force of the impact rod 45 on the electric tool 100.

An inclined surface 455 is formed between the second section 452 and the third section 453. When the impact rod 45 moves backward, the inclined surface 455 impacts a side wall of the second guide part 52, to reduce vibration and noise.

The impact rod 45 further includes a connecting section 454 for connecting the first section 451 to the second section 452, a radial size of the connecting section 454 is greater than the radial size of the first section 451 and the radial size of the second section 452, and the connecting section 454 limits the impact rod 45 between the first guide part 51 and the second guide part 52. The stop ring 47 is arranged between the first guide part 51 and the connecting section 454. When the impact rod 45 moves forward, the first section 451 penetrates through the stop ring 47 and the connecting section 454 abuts against the stop ring 47. When the impact rod 45 moves backward, the connecting section 454 abuts against the sleeve 46, to axially limit the impact rod 45.

The slip ring 48 is arranged between the stop ring 47 and the sleeve 46, and the slip ring 48 and the stop ring 47 are limited between the first guide part 51 and the second guide part 52 in a relative sliding manner. When the electric tool 100 performs upward impact operation, the slip ring 48 prevents the stop ring 47 from directly falling onto the impact rod 45 to affect the output. In addition, the slip ring 48 and the stop ring 47 have a certain sliding distance in the axial direction for buffering a forward impact force of the impact rod 45 when unloaded, thereby preventing the stop ring 47 from being broken by impact.

In this embodiment, when the impact rod 45 moves along the direction opposite to the output direction, the second guide part 52 sequentially supports the third section 453 and the second section 452 greater than the third section 453 in diameter; a gap between the second guide part 52 and the third section 453 is added, such that the impact rod 45 is inclined relative to the axis of the air cylinder 41 before moving; when the electric tool 100 is unloaded, the inclination consumes energy of the impact rod 45 moving in the opposite direction to prevent the impact rod 45 from taking the impact hammer 44 away from the locking part 49, thereby preventing impact when the impact hammer 44 is unloaded from affecting the service life of the electric tool 100; when the electric tool 100 is loaded, the inclination also consumes the energy of the impact rod 45 to reduce a recoil force of the impact rod 45 on the electric tool 100; before the impact rod 45 is impacted, the second guide part 52 supports the second section 452; and in this case, an axis of the impact rod 45 coincides with the axis of the air cylinder 41, the impact hammer 44 impacts the impact rod 45 along a linear direction, and the impact rod 45 outputs impact along the linear direction to improve the energy transfer efficiency.

The present disclosure is not limited to the above specific embodiments. Those of ordinary skill in the art can readily understand that there are still many alternative solutions for the electric tool according to the present disclosure without departing from the principle and scope of the present disclosure. The scope of protection of the present disclosure is subject to the content of the claims.

What is claimed is:

1. An electric tool, comprising:

a housing;

a motor accommodated in the housing;

a transmission mechanism; and an impact mechanism, the impact mechanism comprising:

an air cylinder; and an impact rod;

a guide device;

an impact hammer, and a piston arranged in the air cylinder, the piston compressing air and driving the impact hammer to impact the impact rod;

wherein the guide device comprises a first guide part and a second guide part located behind the first guide part;

wherein the impact rod has a first section sliding along the first guide part, and a second section and a third section which slide along the second guide part, and a radial size of the third section is smaller than a radial size of the second section;

when the impact rod moves along an output direction, the second guide part sequentially supports the second section and the third section; and when the impact rod moves along a direction opposite to the output direction, the second guide part sequentially supports the third section and the second section, such that the impact rod is inclined relative to an axis of the air cylinder before moving.

2. The electric tool according to claim 1, wherein an angle of inclination of the impact rod relative to the axis of the air cylinder is 0.2°-0.5°.

3. The electric tool according to claim 1, wherein a radial size of the first section is equal to the radial size of the second section.

4. The electric tool according to claim 1, wherein the impact rod further comprises a connecting section for connecting the first section to the second section, a radial size of the connecting section is greater than the radial size of the first section and the radial size of the second section, and the connecting section limits the impact rod between the first guide part and the second guide part.

5. The electric tool according to claim 4, wherein the first guide part is a first step part protruding inwards along a radial direction of the air cylinder and integrally formed with the air cylinder; and the first section penetrates through the first step part and extends forward.

6. The electric tool according to claim 5, wherein the impact mechanism further comprises a sleeve axially limited in the air cylinder and located behind the first step part, and the second guide part is a second step part protruding inwards along a radial direction of the sleeve.

7. The electric tool according to claim 6, wherein the impact mechanism further comprises a stop ring arranged between the first guide part and the connecting section; when the impact rod moves forward, the first section penetrates through the stop ring and the connecting section abuts against the stop ring; and when the impact rod moves backward, the connecting section abuts against the sleeve.

8. The electric tool according to claim 7, wherein the impact mechanism further comprises a slip ring located between the stop ring and the sleeve, and the stop ring and the slip ring are limited between the first guide part and the second guide part in a relative sliding manner.

9. The electric tool according to claim 6, wherein a flange part protrudes outward along a radial direction of an end part of the impact hammer that faces the impact rod, the impact mechanism further comprises a locking part limited in the air cylinder and clamped with the flange part, and when the electric tool is in an unloaded state, the flange part is clamped in the locking part.

10. The electric tool according to claim 9, wherein a third step surface protrudes inward along a radial direction of an inner wall of the air cylinder, and the sleeve has a front side abutting against the third step surface and a rear side abutting against the locking part.

* * * * *